United States Patent [19]

Wadia et al.

[11] Patent Number: 5,167,489
[45] Date of Patent: Dec. 1, 1992

[54] FORWARD SWEPT ROTOR BLADE

[75] Inventors: Aspi R. Wadia, Loveland; Peter N. Szucs, West Chester; Padmakar M. Niskode, Cincinnati; Pamela A. Battle, Forest Park, all of Ohio

[73] Assignee: General Electric Company, Cincinnati, Ohio

[21] Appl. No.: 684,736

[22] Filed: Apr. 15, 1991

[51] Int. Cl.$^5$ .............................. F01D 1/00
[52] U.S. Cl. .............................. 415/182.1; 415/211.2; 415/218.1; 415/219.1; 416/223 A; 416/238; 416/DIG. 2; 416/DIG. 5; 416/244 A
[58] Field of Search ............... 415/182.1, 211.2, 218.1, 415/219.1, 220, 119; 416/223 R, 223 A, 238, 240 R, 240 A, DIG. 2, DIG. 5, 244 A, 245 R, 228

[56] References Cited

U.S. PATENT DOCUMENTS

| | | | |
|---|---|---|---|
| 1,062,258 | 5/1913 | Schlotter | 415/119 |
| 1,502,865 | 7/1924 | Moody | 415/211.2 |
| 1,929,690 | 10/1933 | Huntman | 416/238 |
| 2,538,739 | 1/1951 | Troller | 415/211.2 |
| 2,962,260 | 11/1960 | Foley | 415/119 X |
| 3,367,423 | 2/1968 | Van Ranst | 416/DIG. 2 |
| 3,584,968 | 6/1971 | Keith | 415/218.1 X |
| 3,618,699 | 11/1971 | Evans et al. | 415/119 X |
| 3,652,179 | 3/1972 | Hagen | 415/218.1 X |
| 3,727,593 | 4/1973 | Enke | 415/218.1 X |
| 3,851,994 | 12/1974 | Seippel | 416/223 |
| 3,989,406 | 11/1976 | Bliss | 416/228 X |
| 4,012,172 | 3/1977 | Schwaar et al. | 416/228 |
| 4,131,387 | 12/1978 | Kazin et al. | 415/119 |
| 4,470,755 | 9/1984 | Bessay | 415/191 |
| 4,569,631 | 2/1986 | Gray, III | 416/238 X |
| 4,652,212 | 3/1987 | Burger et al. | 416/188 |
| 4,684,324 | 8/1987 | Peroswo | 416/238 X |
| 4,726,737 | 2/1988 | Weingold et al. | 416/223 A |
| 4,790,725 | 12/1988 | Bousquet et al. | 416/245 R |
| 4,838,759 | 6/1989 | Dunn et al. | 415/218.1 X |
| 4,909,711 | 3/1990 | Burgbacher et al. | 415/218.1 X |

FOREIGN PATENT DOCUMENTS

| | | | |
|---|---|---|---|
| 474747 | 4/1929 | Fed. Rep. of Germany | 416/238 |
| 2821776 | 9/1979 | Fed. Rep. of Germany | 416/223 R |
| 3047501 | 7/1982 | Fed. Rep. of Germany | 416/238 |
| 199997 | 9/1987 | Japan | 416/228 |
| 2906 | of 1876 | United Kingdom | 416/238 |
| 2164098 | 3/1986 | United Kingdom . | |

OTHER PUBLICATIONS

Smith, Jr. et al., "Sweep and Dihedral Effects in Axial-Flow Turbo-Machinery", Journal of Basic Engineering, Sep. 1963, pp. 401-416.

Primary Examiner—Edward K. Look
Assistant Examiner—Todd Mattingly
Attorney, Agent, or Firm—Jerome C. Squillaro

[57] ABSTRACT

A rotor blade includes a root, tip, leading edge, trailing edge, forward surface, and aft surface, and a pitch section disposed equidistantly between the root and tip. The blade has a forward sweep from at least the pitch section to the blade tip relative to incoming streamsurfaces of a fluid flowable over the blade.

20 Claims, 4 Drawing Sheets

FORWARD SWEPT ROTOR BLADE

TECHNICAL FIELD

The present invention relates generally to gas turbine engine fans and compressors, and, more specifically, to an improved blade in combination therewith.

BACKGROUND ART

Gas turbine engine fans or compressors include a plurality of circumferentially spaced rotor blades which operate at rotational speeds which result in subsonic through supersonic flow of air over the blades thereof. Swept-back blades include a leading edge which is inclined rearwardly relative to the incoming air for reducing shock losses and noise generation at supersonic operation of the blade. Backward sweep is applied conventionally for both mechanical and aeroelastic considerations including being able to provide suitable structural strength at speed and acceptable levels of vibratory induced stress.

Although the swept-back rotor blade is effective for reducing shock losses, the blade tip sections are accordingly located further axially downstream from the pitch, or midspan, section of the blade. As a result, the boundary layer air which is centrifuged radially outwardly along the blade as the blade rotates collects adjacent to the blade tip, which is disposed radially inwardly from a conventional casing. The accumulation of this boundary layer at the blade tip interacts with the shock systems occurring at the blade tip which result in a decrease in aerodynamic performance. The blade tip boundary layer is formed in main by frictional, diffusion and tip clearance effects that tend to be enhanced by the aerodynamic effects brought on by backward sweep, and in part by the boundary layer centrifuged radially outwardly along the blade.

To incorporate the backward sweep into the leading edge of the blades, it is conventional to barrel the rotor blades by increasing the blade chords located adjacent to the pitch section of the blade resulting in a barrel-shaped blade. Barrelling the blade in its leading edge region results in the incoming air physically first encountering the leading edge at the pitch section. This in turn causes the air streamtubes to move radially inwardly from the blade tip, which is reflective of added diffusion requirements, which weakens the blade tip flow which in turn is detrimental to the overall performance of the blade row.

OBJECTS OF THE INVENTION

Accordingly, one object of the present invention is to provide a gas turbine engine fan or compressor having a new and improved rotor blade.

Another object of the present invention is to provide a rotor blade effective for reducing aerodynamic losses due to boundary layer accumulation at the tip thereof.

Another object of the present invention is to provide a rotor blade effective for operation from subsonic through supersonic Mach numbers with improved blade tip performance while reducing losses due to shock-boundary layer interaction.

DISCLOSURE OF INVENTION

A rotor blade includes a root, tip, leading edge, trailing edge, forward surface, and aft surface, and a pitch section disposed equidistantly between the root and tip. The blade has a forward sweep relative to incoming streamsurfaces of a fluid flowable over the blade from at least the pitch section to the blade tip.

BRIEF DESCRIPTION OF DRAWINGS

The novel features believed characteristic of the invention are set forth and differentiated in the claims. The invention, in accordance with preferred and exemplary embodiments, together with further objects and advantages thereof, is more particularly described in the following detail description taken in conjunction with the accompanying drawing in which:

FIG. 4 is a schematic representation of the adjacent blades and streamsurface illustrated in FIGS. 2 and 3, taken along line 4—4 of FIG. 3 showing the u-r plane.

MODE(S) FOR CARRYING OUT THE INVENTION

Figure 1:
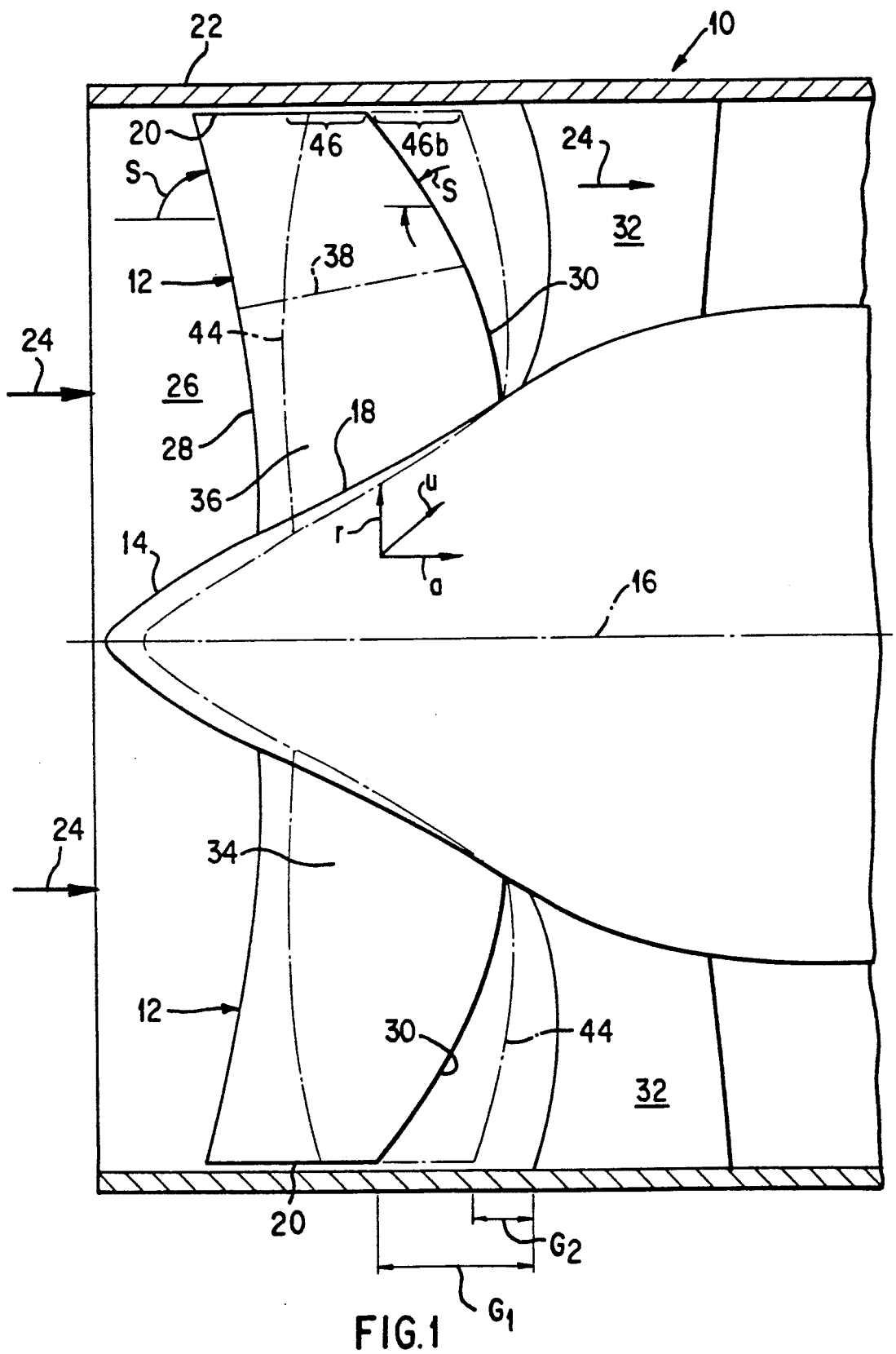
FIG. 1 is a longitudinal, centerline sectional schematic representation of an exemplary gas turbine engine compressor showing side views, or planform views, of forward swept blades in accordance with one embodiment of the present invention.

Illustrated in FIG. 1 is an exemplary single stage gas turbine engine fan, or compressor, 10 in accordance with one embodiment of the present invention. The compressor 10 includes a plurality of rotor blades 12 spaced circumferentially around an annular hub 14 and coaxially about a longitudinal centerline axis 16. Each of the blades 12 includes a root 18 conventionally formed integrally with the hub 14 through each blade having a dovetail arrangement, or by forming an integral assembly conventionally known as a blisk i.e. integral bl[aded-d]isk. Each of the blades 12 further includes at a radially outer end thereof a tip 20 which is spaced radially inwardly from an annular casing 22 surrounding the blades 12. In this exemplary embodiment of the present invention, the hub 14 diverges from the centerline 16 in a downstream flow direction and forms a radially inner boundary for a fluid, or air, 24 which is channeled into the compressor 10, and defines relative to the blade tip 20 and the casing 22 a converging annular flow channel 26 which provides the air 24 to the blades 12 for compression thereof. The air 24 firstly encounters a leading edge 28 of the blade 12 which extends from the root 18 to the tip 20 and then flows in an aft, downstream direction past a trailing edge 30 of the blade 12 which also extends from the root 18 to the tip 20. The air 24 continues to travel in the flow channel 26 to eventually reach a conventional row of circumferentially spaced stator vanes 32.

The blade 12 further includes a forward, or pressure, side surface 34 extending from the root 18 to the tip 20 between the leading edge 28 and the trailing edge 30 which faces in a direction of rotation of the blade 12 indicated by the u-axis of the coordinate system illustrated in FIG. 1. That coordinate system also includes a radial axis r extending radially outwardly relative to the centerline axis 16, and an axial axis, or a-axis extending parallel to the centerline axis 16. An aft, or suction, side surface 36 extends from the root 18 to the tip 20 of each blade, between the leading edge 28 and the trailing edge 30 and faces in a direction opposite to the blade direction rotation which, for the reference coordinate system illustrated, is in the minus u-axis direction. The blade 12 also includes a pitch section 38 which is disposed equidistantly between the root 18 and the tip 20.

In accordance with the present invention, the blade 12 includes a forward, or negative, aerodynamic sweep from at least the pitch section 38 to the tip 20 relative to the incoming streamlines of the air 24 flowable over the blade 12. Aerodynamic sweep is a conventional parameter represented by the inclination of a blade surface, such as the blade leading edge, in the direction of flow relative to the incoming axisymmetric streamsurface 40. A positive sweep angle is indicative of a blade surface inclined in a downstream direction relative to the incoming axisymmetric streamsurface 40 such as in a swept-back rotor blade. A blade surface disposed perpendicularly to the incoming axisymmetric streamsurface has a sweep angle of 0°. In accordance with the present invention, a blade having a negative sweep angle is disclosed wherein at least the tip portion of the blade is inclined in an upstream direction relative to the axisymmetric streamsurface 40 for obtaining forward sweep of the blade.

Figure 2:
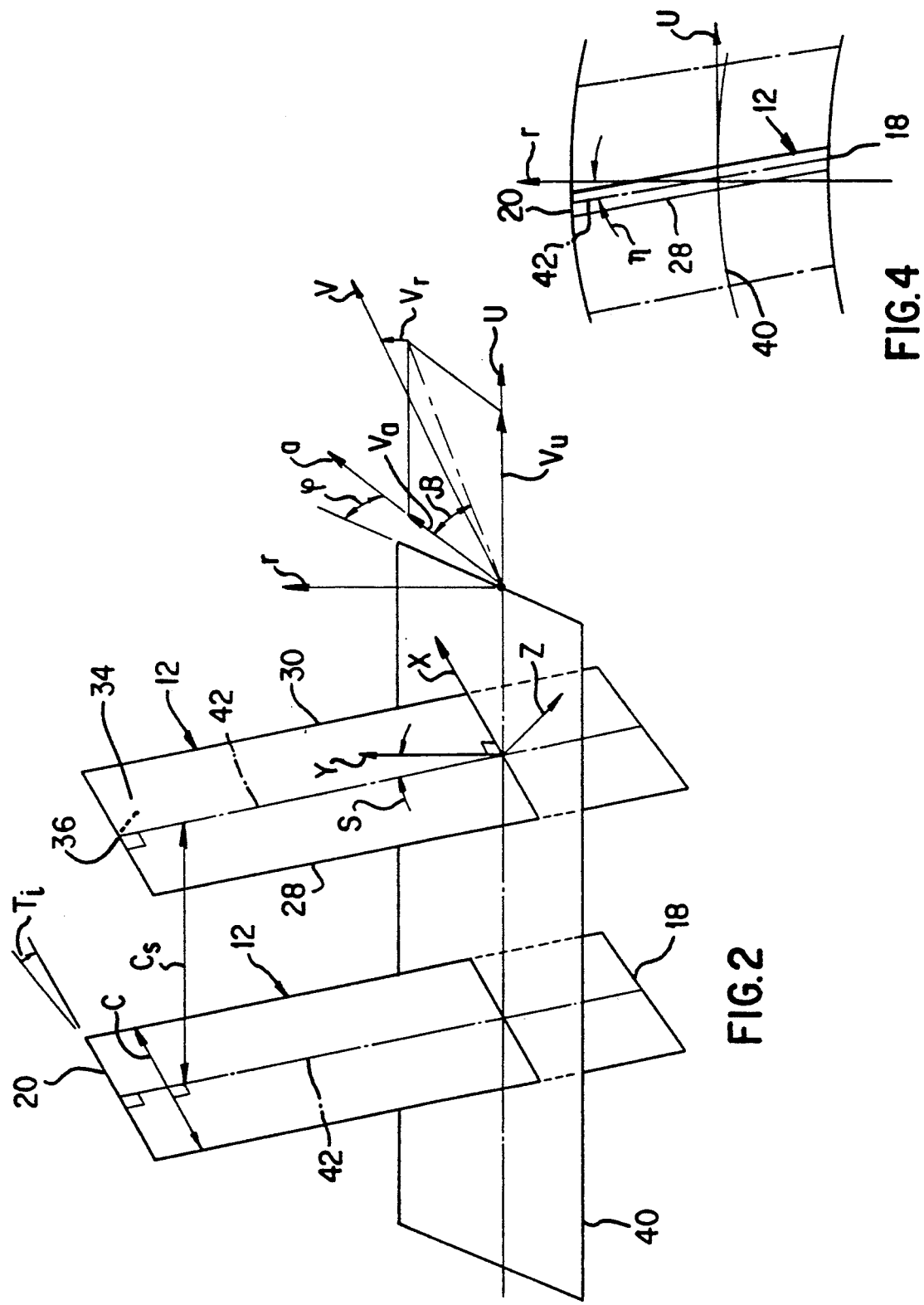
FIG. 2 is a schematic representation of the rotor blades illustrated in FIG. 1 with an exemplary streamsurface flowing thereover, and including exemplary coordinate systems and parameters for defining forward sweep.

Flow of the air 24 through the compressor 10 occurs in generally three dimensions. The blade 18 is typically oriented at a twist angle relative to the incoming air 24 thus providing three components of relative velocity at each radial location on the blade. Illustrated in FIG. 2 is a schematic representation of the blades 12, having forward sweep in accordance with the present invention, with a representative axisymmetric streamsurface 40 passing through one of the radial sections of the blade. It is understood that conventional 2-D streamlines are projections of the 3-D streamsurfaces 40 over the blade 12. Each of the blades 72 includes a chord C extending from the leading edge 28 to the trailing edge 30 at each radial section, and the length of the chord C varies in accordance with conventional aerodynamic practice. The blades 18 are also conventionally circumferentially spaced from each other along the u-axis at a distance $C_s$. The conventionally known expression solidity indicates the relative number of blades 12 about the circumference which may be defined as the length of the chord C divided by the spacing $C_s$ between adjacent blades at, for example, the pitch section 38. The relative velocity vector V lying in the axisymmetric streamsurface 40 may be represented by its respective velocity vector components relative to the u-a-r coordinate system $V_a$, $V_u$ and $V_r$ as shown. The X-Y-Z coordinate system illustrated in FIG. 2 is an alternate coordinate system that is constructed with respect to the axisymmetric streamsurface 40, and of which the X-direction is aligned with the relative velocity direction V and the Y-direction is as indicated normal to the streamsurface 40. The local inclination of any longitudinal axis like the blade axis 42 in the forward or aft X-direction with respect to the Y-axis defines its aerodynamic sweep S.

Figure 3:
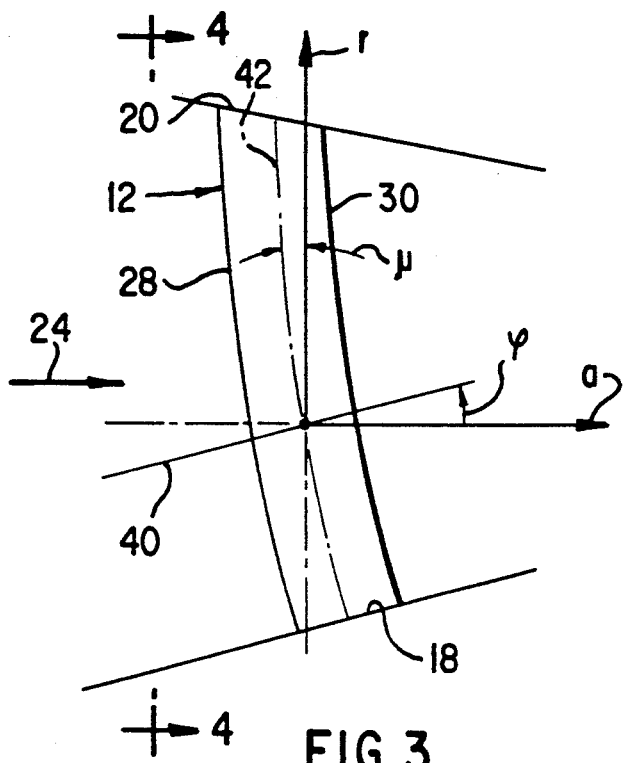
FIG. 3 is a schematic representation of one of the blades and the streamsurface illustrated in FIG. 2 shown in the a-r plane.

To help define parameters that are required to define aerodynamic sweep in terms of more conventionally available vector diagram and blade geometrical quantities in the u-a-r coordinate system, FIGS. 3 and 4 are two additional schematic representations of the orientation of the blade 12 as represented by its conventionally known blade axis 42, relative to the air 24 as represented by the streamsurface 40.

The conventionally known aerodynamic sweep angle S may be represented as follows:

$$\sin S = \frac{\tan\rho + \tan\mu + \tan\eta\tan\beta}{\sqrt{(1 + \tan^2\eta + \tan^2\mu)(1 + \tan^2\beta + \tan^2\rho)}}$$

Wherein, $\rho$ = meridional angle, arctan $(V_r/V_a)$, and $V_r$ is the component of the streamline velocity along the radial r-axis, and V is its component along the axial a-axis;

$\beta$ = cylindrical air angle, arctan $V_u/V_a)$, and $V_u$ is the component of the streamline velocity along the circumferential u-axis;

$\mu$ = the local axial tilt angle, or angle of inclination, of a longitudinally extending portion of the blade axis 42 of the blade 12 in the a-r plane relative to the radial r-axis against which the air 24 flows;

$\eta$ = the local tangential lean angle, or angle of inclination, of the longitudinally extending portion of the blade axis 42 of the blade 12 in the u-r plane relative to the r-axis against which the air 24 flows.

Although FIGS. 2–4 are shown with the angles relative to the blade axis 42 i.e. the locus of centers of gravity of each transverse section of the blade 12, this is merely representative, since any local longitudinal surface of the blade 12 may also be used from the root 18 to the tip 20 and from the leading edge 28 to the trailing edge 30 and on both the forward surface 34 and the aft surface 36. Although the sweep angle S is conventional and may vary across the entire outer surface of a blade, in accordance with the present invention the sweep angle S is a forward angle for obtaining the benefits described herein.

Accordingly, the sweep angle S is a function of the direction of the incoming air 24, the orientation of the axisyxmetric streamsheet 40, the tangential lean angle $\eta$, and the axial tilt angle $\mu$.

Referring again to FIG. 1, the aerodynamic sweep as represented by the sweep angle S is shown at exemplary locations on the leading edge 28 and the trailing edge 30, it being understood that the sweep angle S has a distinct value at each point on the surfaces of the blade 18 from the root 18 to the tip 20 and between the leading edge 28 and the trailing edge 30. In accordance with one embodiment of the present invention, the blade 12 preferably includes forward sweep of either the leading edge 28, or the trailing edge 30, or both the leading edge 28 and the trailing edge 30 as illustrated in FIG. 1. In accordance with a preferred embodiment of the present invention, the sweep S increases from the leading edge 28 to the trailing edge 30 with the maximum sweep occurring at the trailing edge 30 for this exemplary embodiment. Of course, particular values of the sweep angle S will be specifically determined for each particular compressor application in accordance with conventional aerodynamic design of the overall compressor including conventional mechanical design considerations. However, in accordance with the present invention the forward sweep, or negative values of the sweep angle S, are desired for obtaining improved performance.

More specifically, and again referring to FIG. 1, a conventional blade profile is shown in phantom line and designated 44. During conventional operation of the blade 44 at supersonic tip speeds, for example, a boundary layer of the air 24 is centrifuged radially outwardly and accumulates along the entire tip region of the blade 44 since the blade extends generally radially outwardly without appreciable axial tilt. Along with the shock and its interaction with the local boundary layer produced at the blade tip region, the accumulated boundary layer results in a decrease in aerodynamic performance. However, in accordance with one benefit of the present invention, the forward swept blade, results in the blade tip 20 being disposed further upstream relative to the tip of the conventional blade 44, moving upstream a trailing edge tip section 46 relative to a corresponding trailing edge tip section 46b of the conventional blade 44. Since the boundary layer air beginning at the leading edge 28 will be centrifuged radially outwardly, a portion of the boundary layer generated on surfaces 34 and 36 which migrates radially outwardly will reach aft of the trailing edge tip section 46, and therefore will not accumulate in that region. Accordingly, less boundary layer will accumulate at the tip section 46 of the blade 12 than would otherwise occur in the conventional blade 44 thusly leading to improved aerodynamic performance.

Also in the preferred embodiment of the present invention, the leading edge 28 includes forward sweep from the root 18 to the tip 20, while the trailing edge 30 includes forward sweep from at least about the pitch section 38 to the tip 20. More specifically, the trailing edge 30 includes forward sweep down to just above the root 18, while keeping aft, or positive, sweep from the root 18 to a relatively short radial distance as shown. In this way, both the leading edge 28 and the trailing edge 30 remain inclined or swept relative to the air 24 for obtaining the conventionally known benefit of reducing shock losses due to such inclined flow.

Furthermore, the forward sweep of the trailing edge 30 allows the boundary layer air being centrifuged radially outwardly to leave the blade 12 at the forwardly inclined trailing edge 30 and not accumulate at the blade tip 20 since the tip 20 is disposed upstream of the substantial trailing edge region of the blade 12. Note that the blade tip 20 at the trailing edge 30 is disposed about 50% of the axial chord distance of the root 18 upstream of the trailing edge 30 at the root 18. Accordingly, relatively little of the tip 20 is disposed directly radially outwardly from the root 18 for accumulating the centrifuged boundary layer flow. Instead, the centrifuged boundary layer flow is primarily discharged from the blade 12 along the trailing edge 30.

In a preferred embodiment of the present invention, the forward sweep S is within the range of greater than about 0° and up to about 60°. And, as described above, the forward sweep at the trailing edge 30 of the blade 12 is preferably greater than the forward sweep at the leading edge 28 of the blade 12 for this exemplary embodiment.

Referring again to FIG. 2, the sweep angle S is illustrated, for example, relative to the blade axis 42 at the intersection thereof with the exemplary streamsurface 40 at a generally midspan region of the blade 12. However, FIG. 2 is merely a schematic drawing and the sweep angle S is identically defined at any point along the surfaces of the blade 12 from the root 18 to the tip 20 and between the leading edge 28 and the trailing edge 30 on either the forward surface 34 or the aft surface 36. As illustrated in FIGS. 3 and 4, and as represented in the sweep angle equation presented above, the sweep angle S includes two major components i.e. axial tilt $\mu$ and the tangential lean $\eta$.

Accordingly, the sweep angle S is related to the angular inclination of the streamsurface 40 which flows over the blade 12 (i.e. at angular orientation $\beta$, $\rho$) relative to the angular orientation of the radially (longitudinally) extending surfaces of the blade 12 relative to the radial r-axis. The significance of forward sweep at points on the blade 12 is that the radial orientation of the blade at such points is inclined forwardly at an acute angle less than 90° and greater than 0° relative to the streamsurface in the incoming air 24 direction, as opposed to aft, or swept-back blade profiles where such surfaces are inclined rearwardly relative to the streamsurface in the incoming relative velocity direction.

As FIGS. 2–4 and the sweep angle equation indicate, the forward sweep may be obtained by including at least one of axial tilt (angle $\mu$ illustrated in FIG. 3) and tangential lean (angle $\eta$ as illustrated in FIG. 4).

Figure 5:
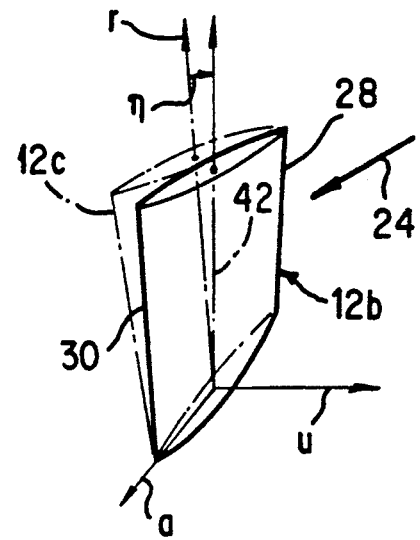
FIG. 5 is a schematic, perspective representation of a second embodiment of a forward swept blade having tangential lean-only.

For example, illustrated in FIG. 5 is a schematic representation of a blade 12b which obtains forward sweep by the use of only tangential lean, or inclination of the blade 12b in the u-r plane only at the acute angle $\eta$. To attain the forward aerodynamic sweep, the blade 12b includes the tangential lean $\eta$ in the blade rotation i.e. a positive angle $\eta$ from the r-axis in the clockwise direction toward the positive u-axis. Also as shown in FIG. 5, this exemplary embodiment of the blade 12b has forward sweep primarily in the trailing edge 30 which is inclined at the angle $\eta$ from a radially oriented (without tangential lean) blade 12c shown in phantom line, and the leading edge 28 includes substantially zero sweep and is generally coincident with the leading edge of the radially oriented blade 12c. This could have mechanical advantages as well as provide an uncambering of the tip region blade sections that are favorable for high speed performance enhancements. Additional features and advantages of the blade 12b having forward sweep with tangential lean only are described in further detail below.

As described above for the blade 12 illustrated in FIGS. 1–4, the blade 12 preferably includes both axial tilt (angle $\mu$) and tangential lean (angle $\eta$) with the particular amount of forward sweep S varying from the root 18 to the tip 20 and from the leading edge 28 to the trailing edge 30, with maximum values preferably being obtained at the trailing edge 30, at least at radial positions greater than the pitch section 38. The blade 12 may be conventionally designed by those skilled in the art for obtaining the particular values of forward sweep on the surfaces thereof as appropriate in accordance with conventional aerodynamic and mechanical design considerations for the compressor 10. In all cases, however, at least some of the advantages disclosed herein due to utilizing the forward sweep in accordance with the present invention may be obtained including for example the reduction in blade tip boundary layer accumulation as described above, while reducing shock losses relative to the incoming streamsurface.

An additional advantage of the present invention may be observed from FIG. 4 wherein the blade 12 preferably includes tangential lean of the leading edge 28 at the tip 20 in a direction opposite to the blade rotation direction, which is a counterclockwise rotation of the blade 12 relative to the u-r plane with the blade tip 20 being disposed at values along the u-axis which are less than those for the blade root 18. Such tangential lean decreases and develops in the leading edge portion at the tip 20 in a forward swept blade that is stacked in a mechanically acceptable manner because of a lowered tip diffusion required by a forward swept blade. By providing this contrarotation tangential lean of the blade tip region at speed of the rotating blade 12, any occasional tip rub between the tip 20 and the casing 22 will tend to bend-over the blade 12 in the direction of blade lean and not dig-in the tip 20 into the casing 22 which will substantially lessen the amount of rub damage which could occur in such a situation.

Figure 6:
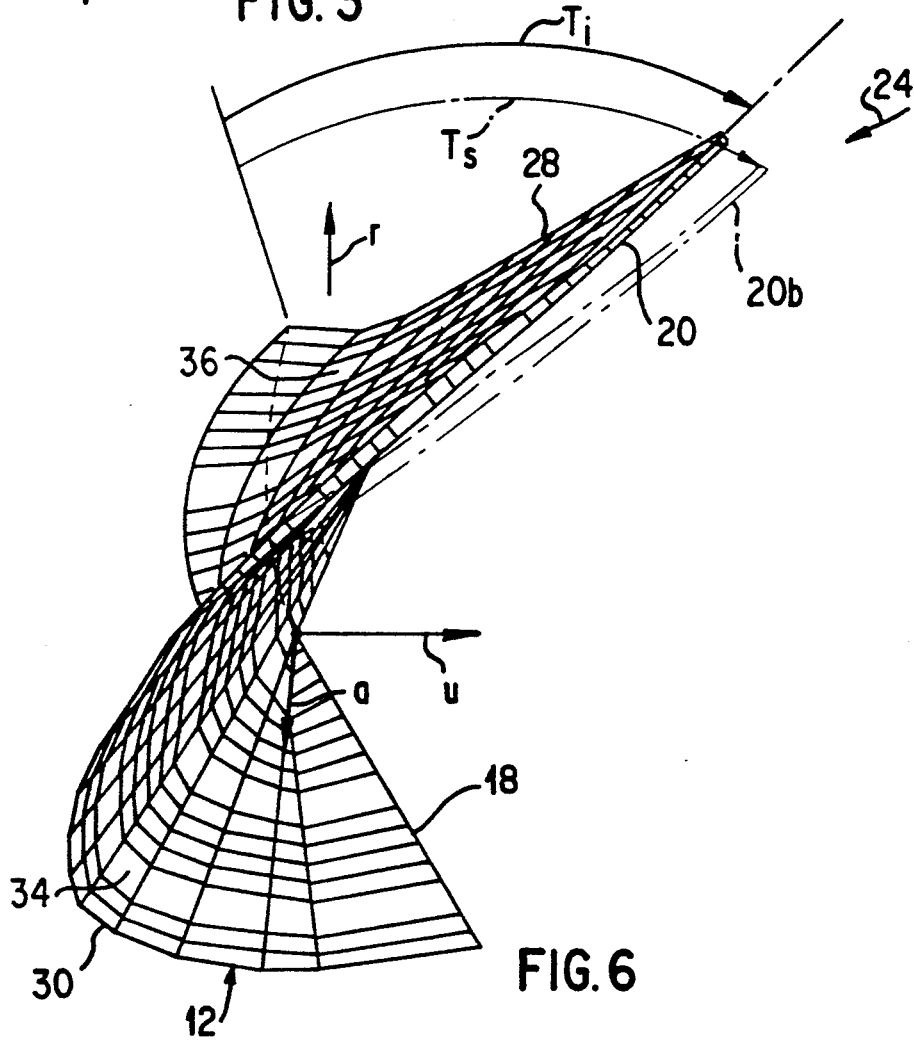
FIG. 6 is a top, perspective schematic representation of the first embodiment of the forward swept blade illustrated in FIG. 1.

As illustrated schematically in FIG. 2, and in perspective in FIG. 6, the blade 12 is typically twisted from the root 18 to the tip 20 over an initial twist angle $T_i$ for conventional aerodynamic purposes. The twist angle $T_i$ at zero speed "cold" condition may be conventionally determined by the difference between the angular orientation in the a-u plane of the respective chords C at the root 18 and the tip 20. By providing forward sweep in the twisted blade 12, including the tangential lean as well as axial tilt from the pitch section 38 to the tip 20, the blade 12, in particular the leading and trailing edges 28 and 30 near the blade tip 20, may be caused to close or twist additionally to a twist angle $T_s$ which is greater than the initial zero speed "cold" twist angle $T_i$ as the blade is accelerated in rotational speed. FIG. 6 illustrates the blade 12 in solid line having the initial twist angle $T_i$ at the tip 20, in its cold condition and the blade tip in phantom line designated 20b at its twisted position at its design rotational speed "hot" condition at the twist angle $T_s$. This additional twisting closed of the blade 12 is opposite to the twisting at speed observed in conventional radial and aft swept blades, which is one indication of the different functioning thereof.

Another significant benefit of the forward swept blade 12 in accordance with the present invention due to the closure or additional twisting of the blade 12 at speed as described above is the ability to obtain divergence free operation of the blade 12 over its conventional operating range. More specifically, a forward swept blade 12 is susceptible to the conventionally known aerodynamic divergence phenomena which could result in increased blade stress due to aeroelastic coupling of the blade 12 with the flow of air 24 thereover. However, by providing the forward sweep as described above for obtaining closure or additional twisting hence the tendency to reduce incidence relative to the exemplary blade 12 at speed, divergence may be reduced or eliminated over a suitable operating range depending upon particular compressor designs.

Referring again to FIG. 1, a forward swept blade 12 is shown superimposed relative to the conventional blade 44 indicated in phantom line for a particular compressor application. The use of the forward swept blade 12 in accordance with one embodiment of the present invention allows for increased solidity of the compressor stage by having increased chord lengths relative to the conventional blade 44. Increased solidity is desirable for blade surface diffusion rate optimization done in the interest of attaining higher efficiency and/or stall limit.

Furthermore, an additional advantage over the forward swept blade 12 is that the use of forward sweep in the trailing edge 30 results in an increased axial gap $G_1$ between the trailing edge 30 and the leading edge of the stators 32 from at least the pitch section 38 to the tip 20 as compared to the axial gap $G_2$ between the trailing edge of the conventional blade 44 and the leading edge of the stators 32. The forward sweep of the blade 12, therefore, positions the tip sections of the blade 12 further upstream relative to the inboard, root, sections of the blade thusly increasing the axial gap between the blades 12 and the stators 32. This provides the significant advantage of reducing the noise level relative to the radial blades 44 having the smaller axial gap $G_2$. The axial gap $G_1$ also reduces the likelihood of the blade tip 20 deflecting during engine operation into the following stators 32 which would result in damage thereto.

Figure 7:
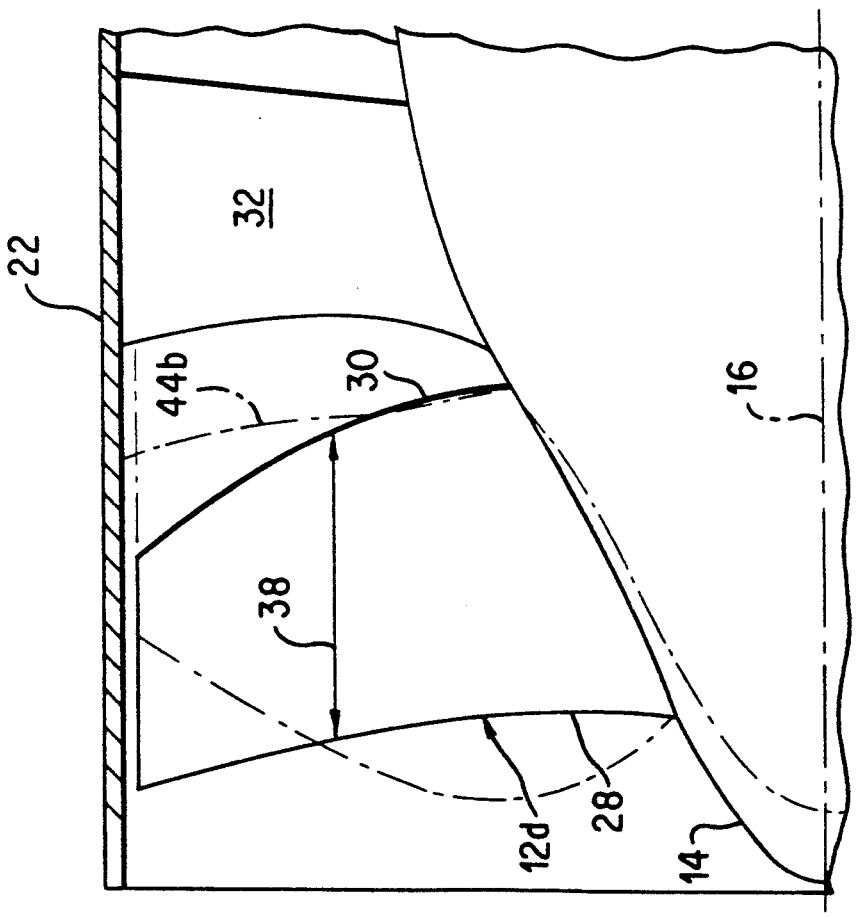
FIG. 7 is a schematic, longitudinal centerline sectional view of a compressor having a forward swept blade with chord barrelling in accordance with another embodiment of the present invention.

As described above, the axial length of the blade 12 is preferably increased by having increased chord length for obtaining the forward sweep. The chord length, and thusly solidity, may be additionally increased by conventionally barrelling the blade 12 as illustrated in FIG. 7 wherein the blade 12 is designated 12d and the trailing edge 30 at the pitch section 38 is barrelled for increasing blade solidity. Shown in phantom line and designated 44b is a conventional aft-swept blade having chord barrelling with increased solidity relative to the conventional radial blade 44 illustrated in FIG. 1, with the forward swept blade 12d having a similar increase in solidity relative to the conventional radial blade 44 illustrated in FIG. 1. Accordingly, the conventionally known solidity benefit in aerodynamic performance of the swept-back blade 44b with chord barrelling may be retained in the forward swept blade 12d by barrelling the trailing edge 30 near the blade midspan region or pitch section 38.

Referring again to FIG. 1, the forward swept blade 12 may be used advantageously in the compressor 10 illustrated wherein the hub 14 diverges in the downstream flow direction relative to the engine axis 16 and forms the converging annular flow channel 26. The blade leading edge 28 has forward sweep and tip 20 of the blade is disposed axially upstream of the root 18 which will then cause the air 24 to contact firstly the blade tip 20 before contacting the blade root 18. Specific flow is a conventionally known term which may be defined as the ratio of the conventionally known inlet corrected flow of the air 24 to the annulus area of the channel 26. For the particular compressor 10 design illustrated, the forward swept leading edge 28 is disposed axially upstream from the conventional blade 44 and extends axially upstream from the root 18 to the tip 20. The leading edge 28 is therefore positioned in a larger annulus area of the channel 26, being increasingly larger from the root 18 to the tip 20, which reduces specific flow and results in a simpler design effort for designing the blades 12 for transonic operation from subsonic to supersonic Mach numbers of the air 24 over the blades 12 and increased performance.

Figure 8:
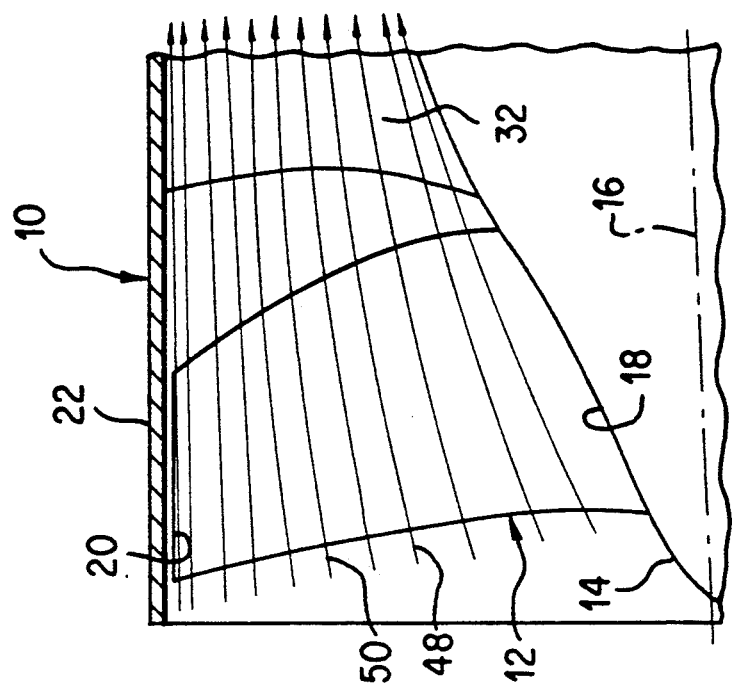
FIG. 8 is a schematic, longitudinal centerline sectional view of the compressor illustrated in FIG. 1 showing streamlines of the air being channeled therethrough.

Another significant advantage of the present invention includes an improvement in the conventionally known streamtube convergence. Illustrated in FIG. 8 is an analytically based fluid flow map of the compressor 10 showing several exemplary streamlines 48 of the air 24 being channeled between the blades 12 and the stators 32. The streamlines 48 are 2-D projections of the 3-D streamsurfaces 40 over the blades 12. It is generally conventionally desirable to impart uniform work, or compression, on the air 24 as it flows through the stage of blades 12. Generally uniform convergence of the streamlines 48 is desirable from the root 18 to the tip 20 as the air 24 flows between the blades 12. However, a conventionally stacked radial or aftswept blade adversely affects the convergence of the streamlines being channeled therebetween. Leading edge projection with conventionally stacked radial blade 44 and swept aft blading 44b results in more convergence near the midspan of the blade, and less convergence, and possibly divergence, of the fluid flow near the blade tip.

In accordance with one feature of the present invention, the forward swept blade results in increased convergence of the streamlines 48 as compared to both a conventional radially oriented blade, such as the conventional blade 44 described above, and the conventional aft swept blade, such as the blade 44b described above. Increased convergence of the streamlines may be obtained from using forward sweep including both tangential lean and axial tilt. Tangential lean from at least the pitch section 38 to the tip 20, with such tangential lean in a direction of rotation of the blade, is effective for obtaining or increasing convergence of the streamlines 48 between the pitch section 38 and the tip 20.

More specifically, shown in FIG. 8 is a median streamline 50, with 50% of the total flow being disposed radially above it while 50% of the total flow is disposed radially below it. Analysis indicates that the median streamline 50 of the exemplary forward swept blade 12 occurs at a larger radius relative to the centerline 16 as compared to the analogous median streamline for the conventional radial blade 44 and the conventional aft swept blade 44b. The median streamline of the aft swept blade 44b, which includes barrelling, is disposed below the median streamline of the conventional radial blade 44 which indicates that the barrelling of the aft-swept blade 44b causes the streamlines to converge more near the midspan of the blade than near the tip region of the blade. The added streamtube convergence which may be obtained from the forward swept blade 12 causes the conventionally known meridional velocity at the trailing edge 30 at the tip 20 to be higher, and the static pressure at the casing 22 near the tip 20 at the trailing edge 30 to be both lower relative to the performance of the radial blade 44 and aft swept blade 44b. This reduced back pressure at the blade tip 20 provides added stability, or surge margin, and enhanced reduction of shock strength for the forward swept blade 12.

Furthermore, the improvement in convergence and reduction in back pressure may be provided in the forward swept blade 12 having barrelling at the trailing edge 30 near the pitch section 38 as shown for the blade 12d of FIG. 7. Although barrelling of a swept aft blade results in more convergence near the blade midspan and less convergence, or divergence, near the blade tip, barrelling of the forward swept blade 12 may be provided for obtaining the advantages due to increased solidity, while still obtaining the good flow convergence as described above. This results in a significant advantage of being able to obtain both convergence of the streamlines 48 in the tip region of the blade 12 while obtaining relatively high solidity near the pitch section 38.

Another advantage due to the use of the forward swept blade 12 is the ability for reducing radar observable signature of the blades 12. By providing the axial tilt to the leading edge 28 of the blade 12, a low observable design is obtained which avoids the undesirable perpendicular orientation of a blade surface relative to the inlet of the compressor 10.

For the embodiment of the blades 12 as described above in a blisk assembly, forward sweep more at the trailing edge 30 over the leading edge 28 is preferred. However, for other embodiments of the invention, including discrete blades conventionally secured to rotor disks using conventional dovetails, the amount of forward sweep may have maximum values at the leading edge over the trailing edge thereof. The degree of forward sweep may be conventionally designed and may vary from blade root to tip and between the leading and trailing edges of a typical blade depending upon particular compressor designs and operating conditions. For example, the forward swept blade in accordance with the present invention may be practiced for blades having conventionally known aspect ratios (blade height divided by pitch chord length) of about 0.5 to about 4.5. Solidity values may range from about 0.5 to about 4.0. The Mach number range of operation of the blades may range from subsonic through transonic, supersonic and hypersonic (high supersonic) speeds. The pressure ratio for the blade stage may range from about 1.0 to about 4.0. The invention may be practiced for axial compressors, as shown, as well as for centrifugal compressors. The blade tips may either be cylindrical, as shown, or conical i.e. with a radius relative to the centerline axis 16 varying from leading edge to trailing edge. And, various conventional contouring of the hub 14 may also be used in conjunction with the forward swept blades 12.

Referring again to FIG. 5 which illustrates the forward swept blade 12b having tangential lean-only, such blade may be provided without significantly increasing the axial length occupied by the blades. The blade 12b may be substantially identical in side projection to the conventional radial blade 44 including substantially identical solidity, but with using tangential lean for obtaining forward sweep. One advantage of this blade is that the weight penalty relative to the conventional radial blade is negligible. Since forward sweep having been obtained with increase in blade axial projection and chord length results in additional mass and blade weight, forward sweep with tangential lean- only may be used for eliminating, or reducing additional weight while still obtaining forward sweep. Furthermore, since there is no increase in axial length of the forward swept blade with tangential lean-only, the bladed rotor can be used in all stages of a multistage axial compressor without any major modifications to the leading and trailing edges of the adjacent stators, and the overall length of the compressor may remain the same as with conventional blading. Yet further, at locations along the radial span of the blade where sweep is not critical, the tangential lean distribution may be conventionally adjusted to obtain a more uniform spanwise and chordwise distribution of the fluid flow streamlines.

While there have been described herein what are considered to be preferred embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims.

We claim:

1. A rotor blade for a gas turbine engine compressor including a plurality of said rotor blades spaced circumferentially around a rotor hub, coaxially about a longitudinal centerline axis, and radially inwardly of an annular casing for channeling and compressing air, said rotor blade comprising:

a root joinable to said rotor hub;

a tip;

a leading edge extending from said root to said tip;

a trailing edge extending from said root to said tip;

a forward surface extending from said root to said tip and between said leading edge and said trailing edge, and facing in a direction of rotation of said blade about said centerline axis;

an aft surface extending from said root to said tip and between said leading edge and said trailing edge on an opposite side of said blade and facing in a direction opposite to said blade rotation direction;

a pitch section disposed equidistantly between said root and tip; and said blade extending generally radially outwardly from said hub along a radial axis disposed perpendicularly to said centerline axis and including a forward aerodynamic sweep from at least said pitch section to said tip relative to an incoming streamsurface of said air flowable over said blade for reducing aerodynamic losses due to boundary layer accumulation at said blade tip, said sweep being represented by a sweep angle S wherein:

$$\sin S = \frac{\tan\rho + \tan\mu + \tan\eta\tan\beta}{\sqrt{(1 + \tan^2\eta + \tan^2\mu)(1 + \tan^2\beta + \tan^2\rho)}}$$

and wherein, $\rho$ = meridional angle, $\arctan(V_r/V_a)$, and $V_r$ is the component of a streamline velocity along said radial axis, and $V_a$ is the component of said streamline velocity along an axial axis extending parallel to said centerline axis;

$\beta$ = cylindrical air angle, $\arctan(V_u/V_a)$, and $V_u$ is the component of said streamline velocity along a circumferential u-axis indicating direction of rotation of said blade;

$\mu$ = local axial tilt angle of a longitudinally extending portion of said blade in an a-r plane relative to said radial axis; and $\eta$ = local tangential lean angle of said longitudinally extending portion of said blade in a u-r plane relative to said radial axis.

2. A blade according to claim 1 wherein said leading edge includes said forward sweep.

3. A blade according to claim 1 wherein said trailing edge includes said forward sweep.

4. A blade according to claim 1 wherein both said leading edge and said trailing edge include said forward sweep.

5. A blade according to claim 1 wherein said forward sweep increases in value from said leading edge to said trailing edge.

6. A blade according to claim 1 wherein said forward sweep extends from said root to said tip.

7. A blade according to claim 1 wherein said forward sweep is within the range of greater than about 0° and up to about 60°.

8. A blade according to claim 1 wherein said forward sweep includes at least one of axial tilt and tangential lean.

9. A blade according to claim 8 wherein said forward sweep includes only tangential lean.

10. A blade according to claim 9 wherein said tangential lean is in said blade rotation direction.

11. A blade according to claim 10 wherein said trailing edge includes said forward sweep and said leading edge includes substantially zero sweep.

12. A blade according to claim 8 wherein said blade includes both said axial tilt and said tangential lean.

13. A blade according to claim 12 wherein said tangential lean is in said opposite blade rotation direction.

14. A blade according to claim 12 wherein said blade is initially twisted from said root to said tip, and said blade forward sweep includes axial tilt and tangential lean from said pitch section to said tip effective for causing said blade to twist additionally greater than said initial twist as said blade is accelerated in speed.

15. A blade according to claim 12 wherein said trailing edge at said pitch section is barrelled.

16. A blade according to claim 12 wherein said hub diverges in a downstream direction relative to said centerline axis and forms a radially inner boundary of said air, and defines relative to said blade tip a converging annular flow channel for channeling said air to contact first said blade tip in a larger inlet annulus area thereby reducing specific flow.

17. A blade according to claim 16 wherein said blade includes tangential lean from said pitch section to said tip for increasing convergence of said streamlines between said pitch section and said tip.

18. A blade according to claim 17 wherein said trailing edge at said pitch section is barrelled and said tangential lean is effective for increasing convergence of said streamlines between said pitch section and said tip.

19. A blade according to claim 16 wherein said compressor further includes a row of stator vanes disposed downstream from said blade and in flow communication therewith, and said blade trailing edge includes forward sweep for increasing an axial gap between said trailing edge and said stator vanes from at least said pitch section to said tip.

20. A blade according to claim 1 wherein said blade is operable from subsonic through supersonic speeds of said air thereover.

* * * * *